(12) United States Patent
Fowler et al.

(10) Patent No.: US 7,126,600 B1
(45) Date of Patent: Oct. 24, 2006

(54) METHOD AND APPARATUS FOR HIGH SPEED BLOCK MODE TRIANGLE RENDERING

(75) Inventors: Mark C. Fowler, Hopkinton, MA (US); Kevin M. Olson, Marlborough, MA (US)

(73) Assignee: ATI International SRL, Hastings Christchurch (BB)

( * ) Notice: Subject to any disclaimer, the term of this patent is extended or adjusted under 35 U.S.C. 154(b) by 445 days.

(21) Appl. No.: 09/629,415

(22) Filed: Aug. 1, 2000

(51) Int. Cl.
*G06T 15/40* (2006.01)

(52) U.S. Cl. ............................. 345/421; 345/620
(58) Field of Classification Search .......... 345/581, 345/582, 589, 419, 428, 619, 421, 620
See application file for complete search history.

(56) References Cited

U.S. PATENT DOCUMENTS

| | | | | |
|---|---|---|---|---|
| 5,214,753 A * | 5/1993 | Lee et al. | ..................... | 345/610 |
| 5,446,836 A * | 8/1995 | Lentz et al. | .................. | 345/441 |
| 5,471,568 A * | 11/1995 | Webb et al. | .................. | 382/199 |
| 5,528,737 A * | 6/1996 | Sfarti | .......................... | 345/441 |
| 5,706,415 A * | 1/1998 | Kelley et al. | ................ | 345/426 |
| 5,798,762 A * | 8/1998 | Sfarti et al. | ................... | 345/420 |
| 5,856,829 A * | 1/1999 | Gray et al. | ................... | 345/422 |
| 5,914,722 A * | 6/1999 | Aleksic | ........................ | 345/423 |
| 5,945,997 A * | 8/1999 | Zhao et al. | .................. | 345/581 |
| 6,016,151 A * | 1/2000 | Lin | ............................ | 345/582 |
| 6,034,699 A * | 3/2000 | Wong et al. | ................. | 345/441 |
| 6,094,201 A * | 7/2000 | Malamy et al. | ............. | 345/441 |
| 6,222,550 B1 * | 4/2001 | Rosman et al. | ............. | 345/419 |
| 6,222,561 B1 * | 4/2001 | Egan | ........................... | 345/501 |
| 6,285,376 B1 * | 9/2001 | Choi et al. | ................... | 345/441 |
| 6,452,600 B1 * | 9/2002 | Parikh et al. | ................ | 345/522 |
| 6,483,519 B1 * | 11/2002 | Long et al. | ................... | 345/619 |
| 6,501,474 B1 * | 12/2002 | Thomson et al. | ........... | 345/441 |
| 6,778,177 B1 * | 8/2004 | Furtner | ........................ | 345/544 |

\* cited by examiner

*Primary Examiner*—Kee M. Tung
*Assistant Examiner*—Michelle K. Lay
(74) *Attorney, Agent, or Firm*—Vedder, Price, Kaufman & Kammholz, P.C.

(57) ABSTRACT

A system for traversing and rendering a graphic primitive, comprising a setup engine that outputs representative values of a graphic primitive; and a raster engine that receives the representative values of the graphic primitive and forms therefrom representative pixels, the raster engine having at least a scan module that scans only pixels within the graphic primitive and assigns data values to each of the pixels and a look-ahead module that identifies pixels that are inside of the primitive.

14 Claims, 4 Drawing Sheets

METHOD AND APPARATUS FOR HIGH SPEED BLOCK MODE TRIANGLE RENDERING

FIELD OF THE INVENTION

The invention relates in general to rendering triangles, and in particular to a method and apparatus for block mode rasterization with optimized edge detection.

BACKGROUND OF THE INVENTION

In the field of computer graphics, the graphics rendering pipeline is the core of real time graphics. The main function of the pipeline is to generate, or render, a two dimensional image, given a virtual camera, three dimensional objects, light sources, lighting models, textures, and more. The locations and shapes of the objects in the scene are determined by their geometry, placement of camera in the environment and the characteristics of that environment. The appearance of the objects is affected by material properties, light sources, textures, and lighting models.

In general, texturing is a technique for efficiently modeling the surface properties of an object. Objects or models are normally represented graphically by triangles, as these are the geometric primitives used by most graphics hardware. Color for each vertex of the surface is computed using location of the light sources and the properties, position, and the normal of the vertex and the properties of the material belonging to the vertex. Thus, the color is computed by taking into account lighting and the material, as well as the viewer's position. Texturing works in modifying the values used in the lighting equation. The pipeline uses complex mathematical equations to blend the colors, textures and other inputs to create properly colored pixels in the image.

In prior art graphics systems a texture memory contains a two dimensional representation of a texture to be mapped onto primitives. Cache provides temporary storage of portions of texture memory for improved access speed. Graphic primitives are stored in a primitive storage portion of memory, and define the size and shape of graphic elements, such as triangles. Primitives are processed by triangle set up modules and traversed using edge walker modules and span walker modules. A texture mapping engine performs the operation of mapping textures stored in a texture memory onto primitives. Pixel processing is performed by 3D pipeline and performs operations on the pixels and writes the resulting rendered image via a render backend module to a frame buffer. The image in the frame buffer is sent to a display.

A primitive typically represents some element of a graphic image on a display screen, and a texture map contains some graphical pattern or image that is to be mapped onto the primitive image. The edge walker and span walker are typically used in the prior art to map texture images onto primitives. A number of different techniques are known in the prior art for scanning primitives. For example, spans of horizontal pixel rows are defined, and each span has a unique y value representing the pixel row. Each span has two edges of the primitives to limit the extent of the span. The primitive is traversed span by span and for each span the pixels within the span are processed in left to right order. A texel in a texture map corresponding to the selected pixel is retrieved. Data for the retrieved texel is rendered for the selective pixel in the primitive. Other pixels in the primitive are processed similarly. A check is performed to determine whether the end of the current span has been reached. This check may be performed, for example, by comparing the x coordinate of the currently selected pixel with the edge of the primitive. If the end of the span has not been reached, the span walker continues by selecting the next pixel and repeating texel retrieval. Operations such as burst mode and pixel walk vectors increase the efficiency of the operation.

U.S. Pat. No. 5,945,997 discloses a block and band oriented traversal and three dimensional triangle rendering. The disclosed system traverses and renders a graphic primitive by using block and band oriented traversal algorithms and texture mapping.

There is a need in the prior art to provide greater efficiency with a minimal amount of hardware for scanning primitives, and in particular, for texture mapping. All of the prior art methods attempt to find the edges of the primitive, by stepping outside the primitive as the pixels are edge walked or spanned.

BRIEF DESCRIPTION OF THE DRAWINGS

The features of the present invention which are believed to be novel, are set forth with particularity in the appended claims. The invention, together with further objects and advantages, may best be understood by reference to the following description taken in connection with the accompanying drawings, in the several figures of which like reference numerals identify like elements.

DETAILED DESCRIPTION OF A PREFERRED EMBODIMENT OF THE INVENTION

Figure 1:
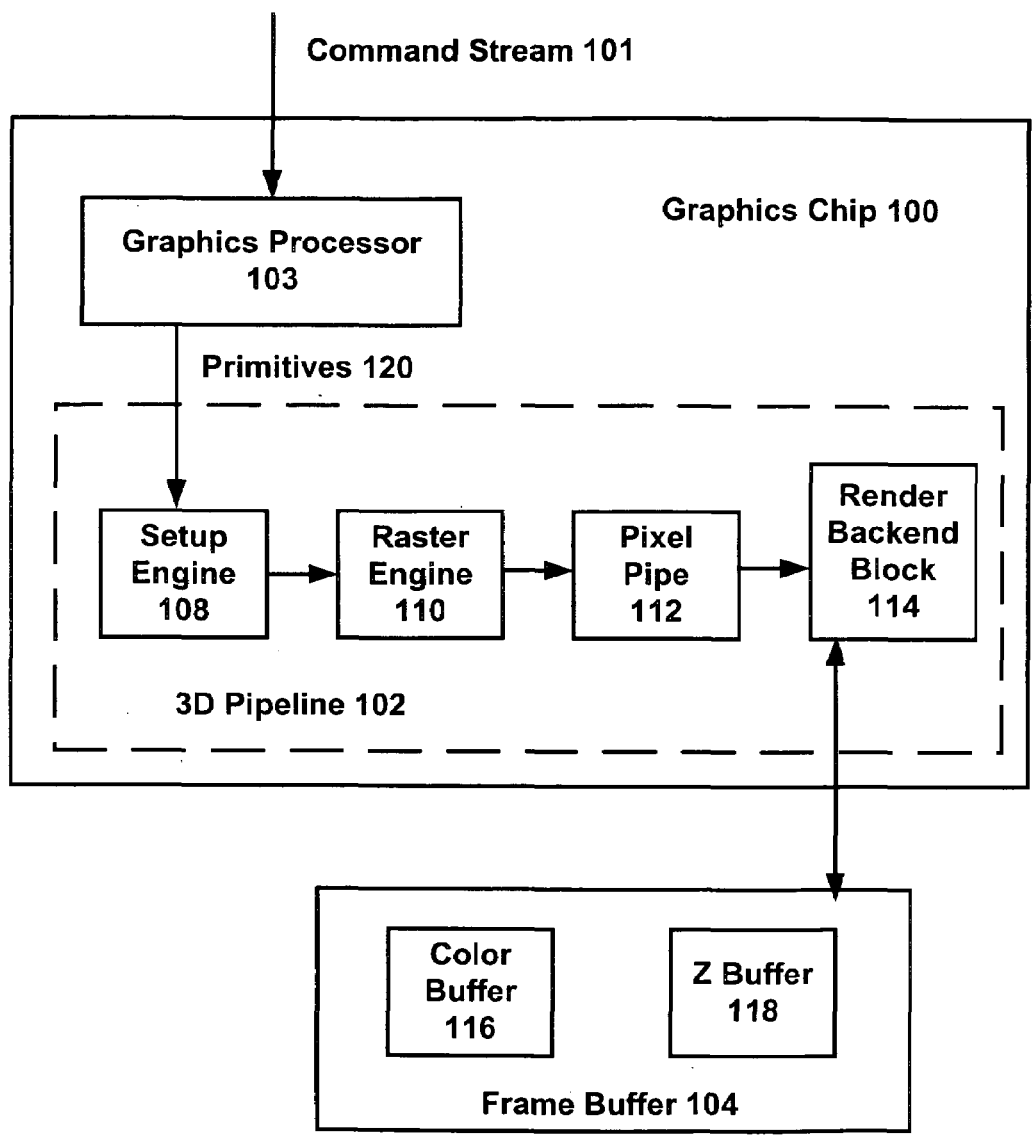
FIG. 1 depicts a 3D pipeline on a graphics chip according to the present invention.

FIG. 1 is a block diagram of a graphics chip 100 operatively coupled to a frame buffer 104 and receiving a command stream 101. In particular, the command stream 101 is received by graphics processor 103 from other stages in the computer equipment, which are not shown. The command stream contains the information for forming an image on a display. The graphics processor 103 processes the information as known in the art to provide primitives 120 that are representative of the desired image. The primitives 120 are received by a setup engine 108 in a 3D pipeline 102. In the setup engine 108 the x y coordinates of the primitives 120 are transformed to form screen coordinates. The screen coordinates together with the z coordinates are also referred to as window coordinates. For example, a window can have a minimum corner at $x_1$, $y_1$ and a maximum corner at $x_2$ $y_2$, where $x_1$ is less than $x_2$, and $y_1$ is less than $y_2$. The primitives are then mapped in this window and have x and y coordinates and z coordinates which indicate which primitives are in front of which primitives. These primitives are then passed on to the raster engine 110. The raster engine 110 is also referred to as a scan converter which converts the two dimensional vertices in screen space (with at least a z value, a color, and a texture coordinate associated with each vertex) into pixels. Unlike previous stages that perform polygon operations, the raster engine stage handles pixel operations. The pixel pipe 112 is operatively connected to the raster engine 110 and a render backend block 114 is operatively connected to the pixel pipe 112. A frame buffer 104, which is connected to the render backend block 114, has at least a color buffer 116 and a z buffer 118. The color buffer 116 stores color formation corresponding to pixels in the display frame, and the z buffer 118 stores corresponding z values for the pixels in the display frame.

Thus, in general the setup engine 108 produces primitive slope information based on the graphic primitives which is supplied to the raster engine 110. The raster engine 110 generates pixel fragments from the primitive slope information. Each pixel fragment includes the color value, a set of coordinates indicating a pixel position to which the value corresponds, and a z value for the fragment.

The raster engine 110 provides the pixel fragments to the pixel pipe 112. The pixel pipe 112 performs various operations that modify the color and texture of the pixel fragment as received from the raster engine 110. With regards to textures this is referred to as a texture mapping operation. The texture fragment resulting from the operations in the pixel pipe 112 then pass to the render backend block 114. The render backend block 114 blends the textured fragments with corresponding pixels in the frame buffer 104 as determined by the set of coordinates for each textured fragment. The z value for each textured fragment is used to blend the fragment with the currently stored pixel information. When the operation is completed the frame buffer can be accessed by display hardware to obtain the pixel information for use in generating a display image.

Figure 2:
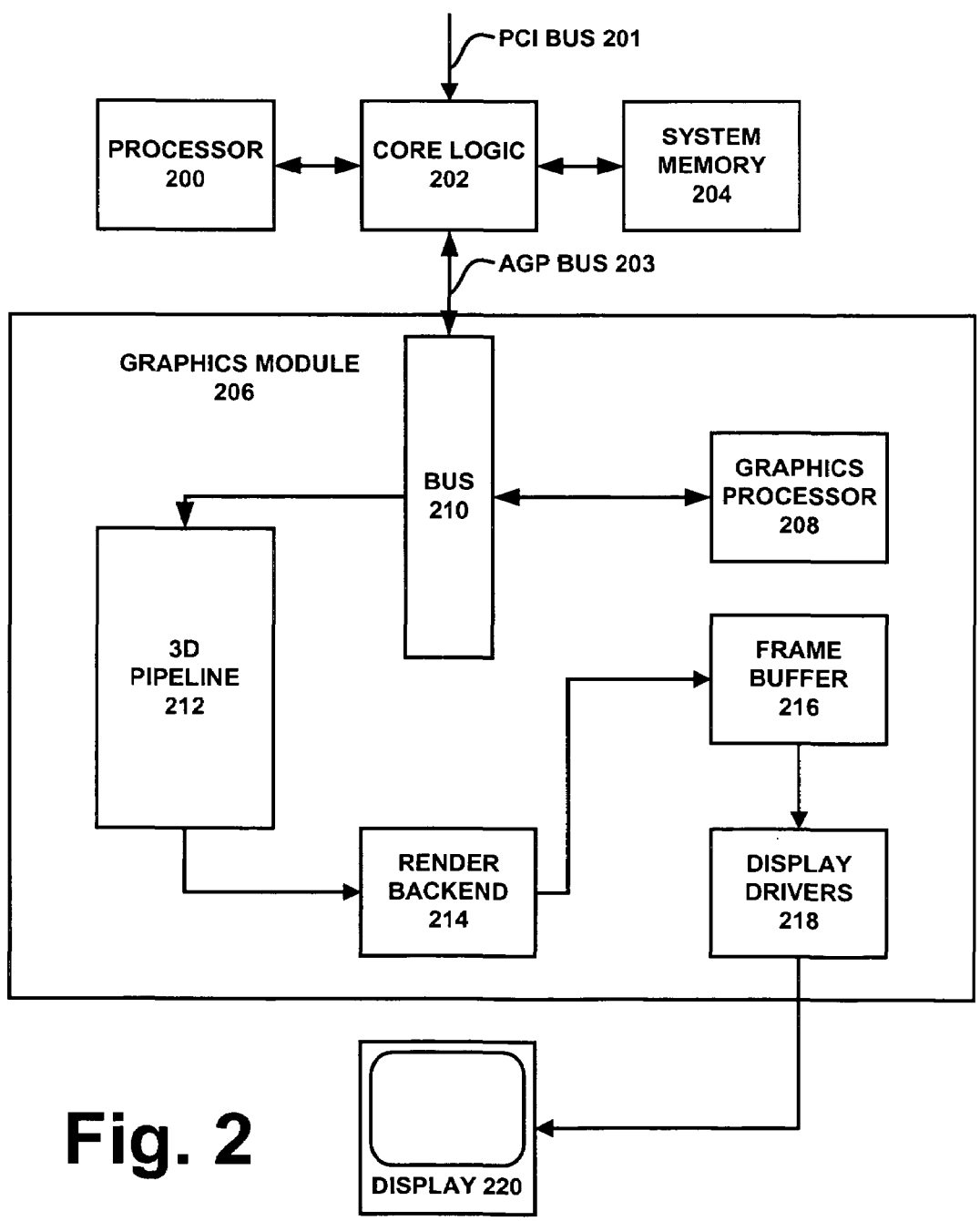
FIG. 2 is a block diagram depicting the raster engine and pipeline depicted in FIG. 1.

FIG. 2 depicts a block diagram of a graphics system which utilizes the present invention. In a graphics system a processor 200 and a system memory 204 are coupled to core logic 202. Core logic 202 has a PCI bus 201, and an AGP bus 203 which couples the core logic 202 to the graphics module 206. The AGP bus 203 is operatively connected to the bus 210 in the graphics module 206. A graphics processor 208 controls operation of a graphics module 206 that is coupled to the bus 210. The 3D pipeline 212 receives primitives from the bus 210 and outputs the graphic data to the render backend 214 which in turn provides the final pixels in the frame buffer 216. Display driver 218 reads the graphics data from the frame buffer 216 and displays the graphics image on the display 220.

Figure 3:
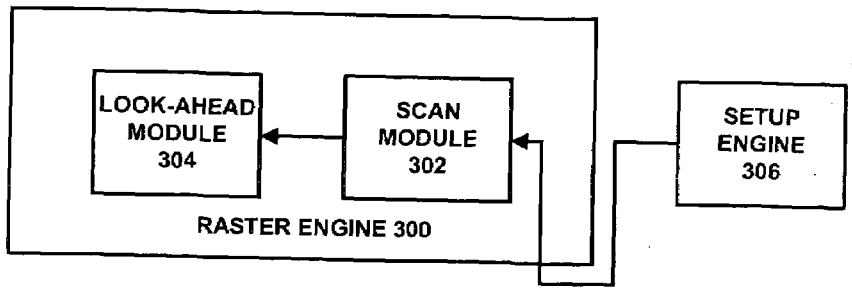
FIG. 3 is a more detailed block diagram depicting the pixel blend stage depicted in FIG. 2.

A system for traversing and rendering a graphic primitive consists of a set up engine (such as set up engine 108 in FIG. 1) that outputs representative values of a graphic primitive. A raster engine (such as raster engine 110 in FIG. 1) receives the representative values of the graphic primitive and forms therefrom representative pixels. The raster engine has at least a scan module that scans only pixels within the graphic primitive and assigns data values (such as color and texture values) to each of the pixels. The raster engine also has a look ahead module that identifies pixels that are inside the primitive. More specifically, the look ahead module determines if the next pixel in the y direction and in the x direction is inside the primitive. FIG. 3 depicts the scan module 302 coupled to the look ahead module 304 in the raster engine 300. In one embodiment, the scan module 302 is structured to perform block mode scanning, such as disclosed in U.S. Pat. No. 5,945,997.

Figure 4:
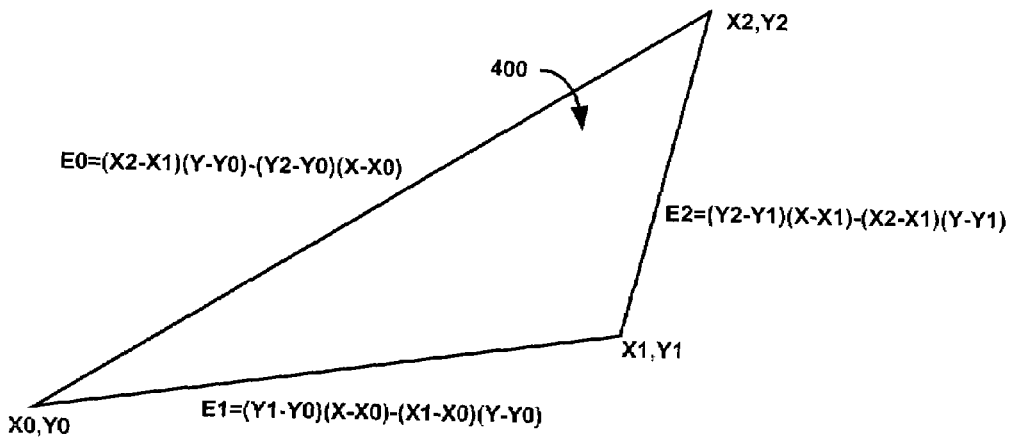
FIG. 4 is a more detailed block diagram of the FIG. 3 pixel blend stage.
Figure 5:
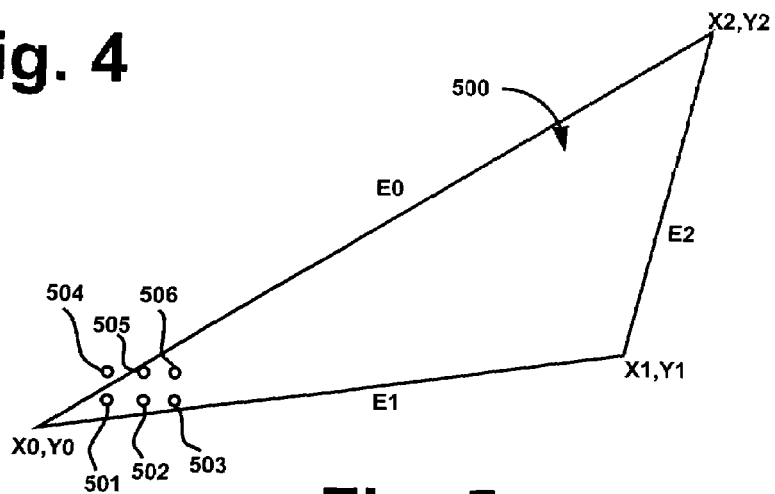
FIG. 5 is a block diagram of an individual math function stage in the FIG. 4 pixel blend stop.

The graphic primitive can take the form of a triangle as depicted in FIGS. 4 and 5 of the drawings. As shown in FIG. 4, a primitive 400 has vertices at X0, Y0, X2, Y2 and X1, Y1. The set up engine, such as set up engine 306 depicted in FIG. 3, determines the edge functions E0, E1 and E2 for the triangular primitive 400 wherein each edge function is associated with one particular edge of the graphic primitive. These edge functions are determined by the formulas depicted in FIG. 4 with the use of the three vertices, and the x,y variables for a pixel. Given the x,y coordinates of a particular pixel, if the three edge functions provide positive results, this means that the pixel is within the primitive 400. If any one of the edge functions provides a negative result it indicates that the pixel is outside of the primitive 400. The set up engine 306 also determines which of the edges is longest for the primitive 400 (this being the E0 edge function). The set up engine 306 also determines the starting vertices X0,Y0 for the primitive.

As shown in FIG. 5, as pixels are scanned by the scan module 302 (such as pixels 501, 502 and 503), the look ahead 304 will calculate the edge functions for the pixel which is next in the y direction of the current pixel being processed. For example, referring to FIG. 5, while pixel 501 is being processed by the scan module 302, the look ahead module 304 calculates the edge functions for pixel 504 and concludes that this pixel is outside the triangle 500. When the scan module moves to the pixel 502, the look ahead module 304 then calculates the edge functions for the pixel 505 and will determine that the pixel 505 is within the triangular primitive 500. Having determined that the pixel 505 is within the triangular primitive 500 the look ahead module then stores the color or texture value associated with pixel 505 in a register. (This color or texture value associated with the pixel is also referred to in general as a data value.)

The operation of the scan module 302 and the look ahead module 304 is such that when the scan module 302 has processed the last pixel (such as pixel 503) in a scan line, the scanning of the next scan line will begin with pixel 505 which was identified by the look ahead module 304 as being inside the primitive 500. This eliminates what are referred to as dead cycles (that is, the processing of pixel 504 which is outside of the primitive 500) and therefore greatly increases the efficiency and speed, as well as reducing circuit complexity (as will be explained below).

Figure 6:
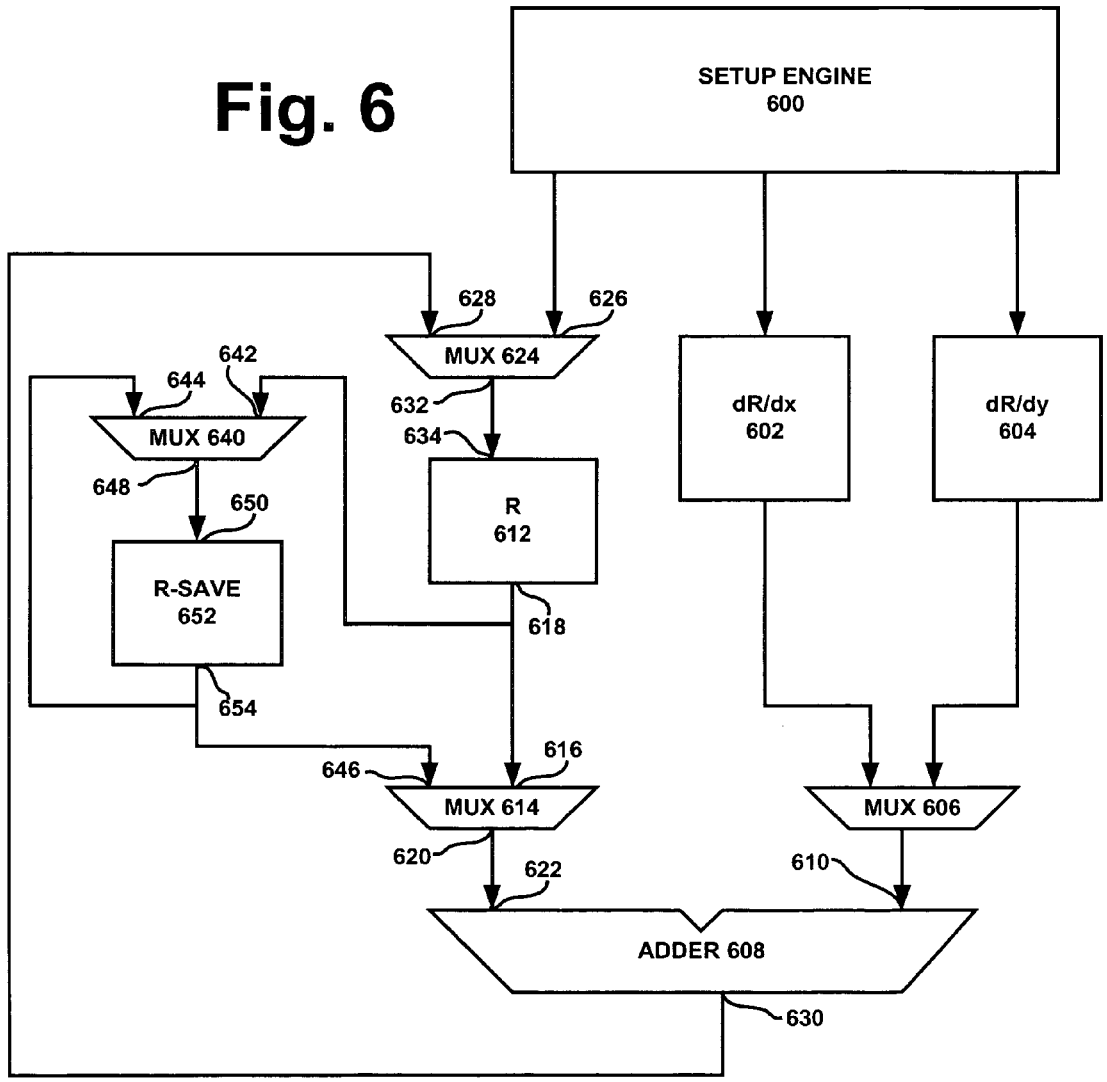
FIG. 6 is a more detailed block diagram depicting the pixel blend stage of FIG. 2.

Referring now to FIG. 6, the set up engine 600 provides slope information (such as, for example, for a color red), dR/dx and dR/dy. Registers 602 and 604 have inputs connected to the set up engine 600 for storing the slope information for the x and y position, respectively. Outputs of the registers 602 and 604 are connected to inputs of a first multiplexer 606. An adder 608 has a first input 610 connected to the output of the first multiplexer 606. A third register 612 stores a characteristic value (such as a red value) for a predetermined pixel. A second multiplexer 614 has a first input 616 connected to the output 618 of the third register 612, and has an output 620 connected to a second input 622 of the adder 608. A third multiplexer 624 has a first input 626 connected to the set up engine 600 and a second input 628 connected to an output 630 of the adder 608. The output 632 of the third multiplexer 624 is connected to the input 634 of the register 612. These elements form the scan module described above.

A fourth multiplexer 640 has a first input 642 connected to the output 618 of the third register 612 and has a second input 644 connected to a second input 646 of the second multiplexer 614. The output 648 of the fourth multiplexer 640 is connected to the input 650 of a fourth register 652. The output of the fourth register 652 is connected to the second input 646 of the second multiplexer 614. The fourth register 652 stores the data value for the pixel which is next in the y direction from the currently processed pixel, provided that the next pixel in the y direction is within the primitive. These elements form the look ahead module described above. The third register 612 stores the data value for the current pixel being processed. The data value can be one of a color value and a texture value that is associated with the pixel.

Thus the present invention provides an efficient system and method for rendering triangles in a scan line, especially in view of reading texture data. By looking ahead to a next pixel while processing a current pixel, the present invention overcomes the problem in the prior art wherein typical scan converter algorithms track edge functions for a pixel that is being currently processed. The present invention overcomes the problem in the prior art which wastes cycles by stepping outside the triangle when trying to determine if the next pixel is outside or within the triangle. The present invention improves the texture operations by walking the triangle in a block mode rasterization pattern and implements an optimized edge detection algorithm that actually tracks the edge functions of the next pixel in the x direction and the next pixel in the y direction instead of tracking the edge functions for the pixel it is currently on. Not only is the present invention an improvement in efficiency of operation over prior art scan conversion methods and apparatus, but it also results in significant hardware savings in that for each of the circuitry such as depicted in FIG. 6, there is one less adder than in prior art circuits. This is significant when it is realized that there are as many as 26–28 circuits as depicted in FIG. 6 that are used in typical graphics systems to process the different colors and textures.

The invention is not limited to the particular details of the apparatus and method depicted and other modifications and applications are contemplated. For example, there are elements and stages that can be implemented in hardware and/or software, or combinations thereof. It is intended, therefore, that the subject matter in the above depiction shall be interpreted as illustrative and not in a limiting sense.

What is claimed is:

1. A system for traversing and rendering a graphic primitive, comprising:
   a setup engine that outputs representative values of a graphic primitive including edge functions of the graphic primitive;
   a raster engine that receives the representative values of the graphic primitive and wherein the raster engine forms therefrom representative pixels, the raster engine having at least a scan module and a look-ahead module; and
   wherein the scan module successively scans a current pixel previously identified as being within the graphic primitive by the look-ahead module while the look-ahead module successively processes a next pixel using the edge functions and determines if the next pixel is within the graphic primitive.

2. The system according to claim 1, wherein the scan module is structured to perform block mode scanning.

3. The system according to claim 1, wherein the graphic primitive is a triangle, and wherein the representative values are at least one edge function of the triangle and slope values for an x and y position of the triangle.

4. The system according to claim 1, wherein the graphic primitive is a triangle, and wherein the representative values are at least one edge function of a longest side of the triangle and slope values for an x and y position of the triangle.

5. The system according to claim 1, wherein each edge function is associated with one particular edge of the graphic primitive.

6. The system according to claim 5, wherein the look-up module uses at least one edge function to determine whether the next pixel is within the graphic primitive.

7. A system for traversing and rendering a graphic primitive, comprising:
   a setup engine having an output that outputs representative values of the graphic primitive including x and y slope data;
   a raster engine that receives the representative values of the graphic primitive and forms therefrom representative pixels, the raster engine having at least a scan module that scans only pixels within the graphic primitive and assigns data values to each of the pixels and a look-ahead module that identifies pixels that are inside of the graphic primitive; and
   wherein the scan module includes:
      first and second registers for storing the x and y slope data, respectively, for a predetermined current pixel in the graphic primitive;
      a first multiplexer having inputs connected to outputs of the first and second registers, and having an output;
      an adder having first and second inputs and having an output, the first input of the adder connected to the output of the first multiplexer;
      a third register for receiving a characteristic value for the predetermined current pixel, the third register having an input and an output;
      a second multiplexer having first and second inputs and an output, the first input of the second multiplexer connected to the output of the third register, and the output of the second multiplexer connected to the second input of the adder;
      a third multiplexer having first and second inputs and an output, the first input of the third multiplexer connected to the setup engine output and the second input connected to the output of the adder, and the output of the third multiplexer connected to the input of the third register;
      a fourth multiplexer having first and second inputs and an output, the first input connected to the output of the third register; and
      a fourth register having an input connected to the output of the fourth multiplexer, and having an output connected to the second input of the second multiplexer, the output of the fourth register also connected to the second input of the fourth multiplexer.

8. The system according to claim 7, wherein the third register stores a data value for the current pixel, and wherein the fourth register stores a data value for a next pixel that is inside the graphic primitive.

9. The system according to claim 7, wherein the data value for the current pixel is one of a color value and a texture value, and wherein the data value for the next pixel is one of a color value and a texture value.

10. A method in a graphics system for traversing and rendering a graphic primitive, comprising:
    determining representative values of the graphic primitive; and
    successively determining from the representative values of the graphic primitive data values for a current pixel that is previously identified as being within the graphic primitive, while successively looking ahead to a next adjacent pixel to determine if the next adjacent pixel is within the graphic primitive using edge functions and
    storing a characteristic value for the next adjacent pixel when the next adjacent pixel is within the graphic primitive.

11. The method according to claim 10, wherein the method further includes performing block mode scanning.

12. The method according to claim 10, wherein the graphic primitive is a triangle, and wherein the representative values of the graphic primitive are at least one edge function of the triangle and slope values for an x and y position of the triangle.

13. The method according to claim 10, wherein the graphic primitive is a triangle, and wherein the representative values of the graphic primitive are at least one edge function of a longest side of the triangle and slope values for an x and y position of the triangle.

14. A graphics system, comprising:
- a first module that generates edge functions for a triangular graphic primitive, wherein the first module further indicates which of the edge functions corresponds to a longest side of the triangular graphic primitive, and further provides starting coordinates for the triangular graphic primitive and
- a second module that forms pixels using the edge functions of the triangular graphic primitive and that provides at least one data value for each current pixel previously identified as being within the triangular graphic primitive while
- a third module successively determines if a next pixel is within the triangular graphic primitive, and stores at least one data value of the next pixel when the next pixel is inside of the triangular graphic primitive.

* * * * *